Patented Jan. 1, 1935

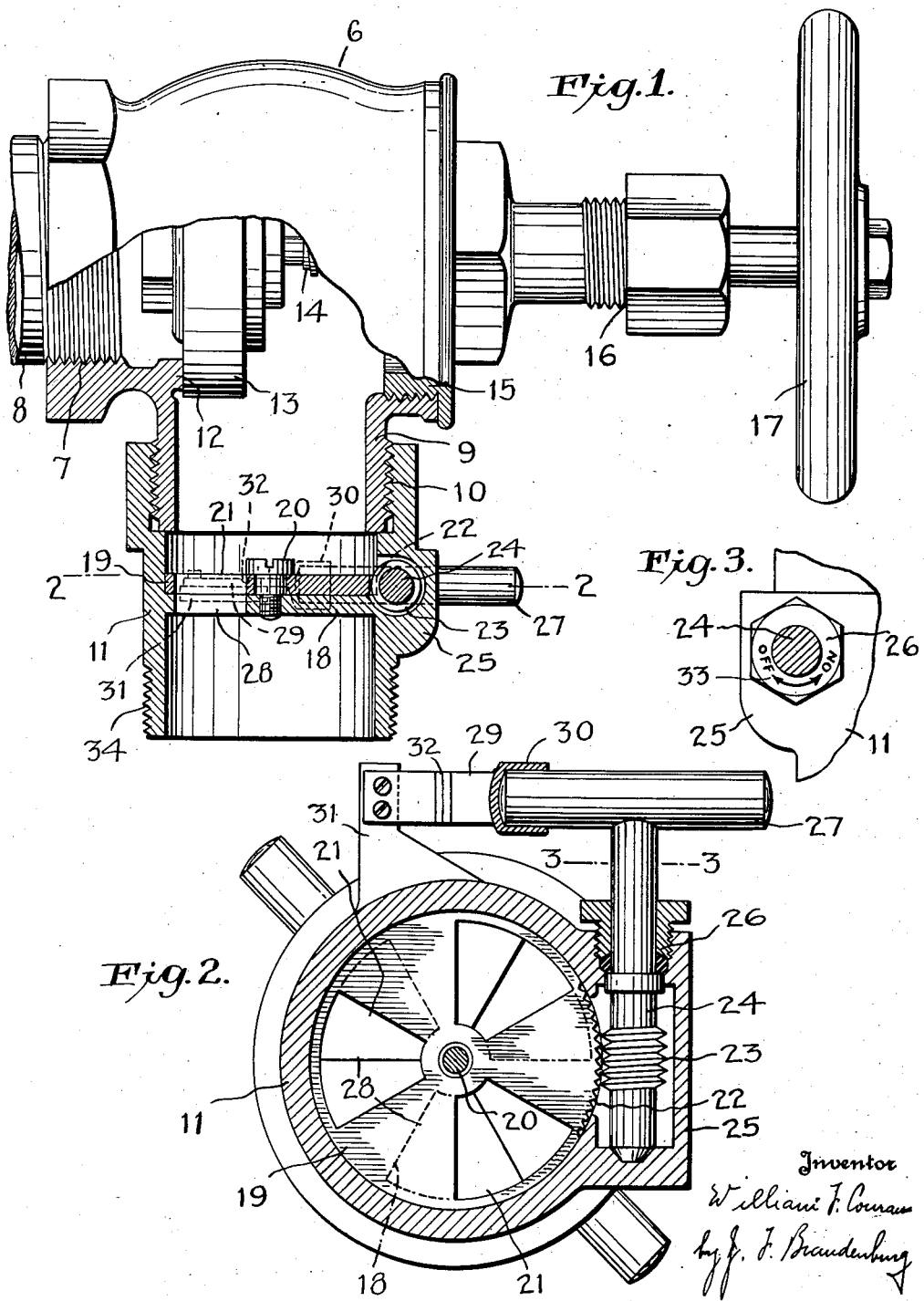

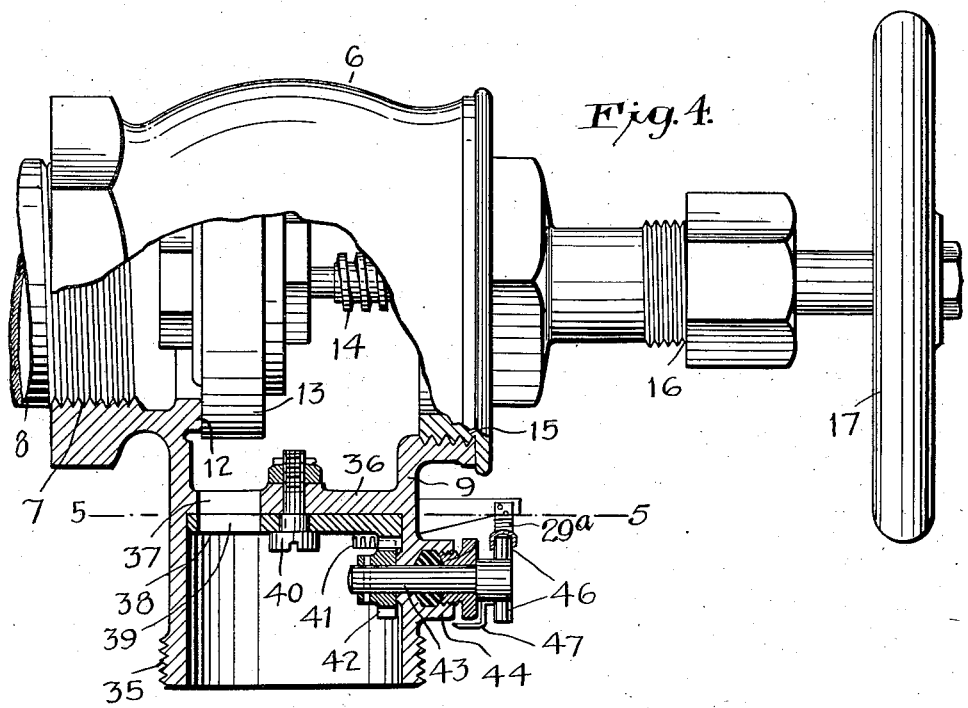
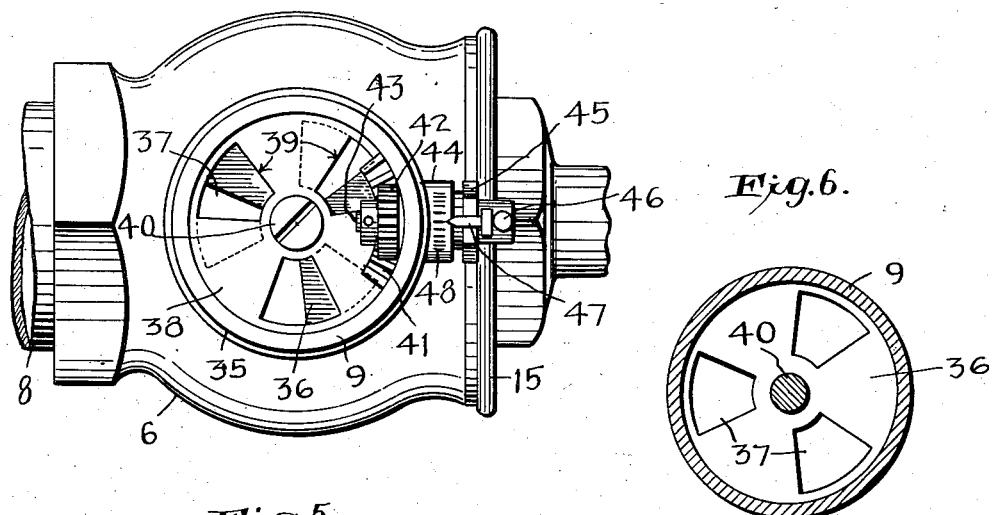

1,986,252

UNITED STATES PATENT OFFICE 1,986,252

REGULATOR DEVICE

William F. Conran, Brooklyn, N. Y.

Application December 13, 1930, Serial No. 502,073

1 Claim. (Cl. 251—163)

My invention relates to means for controlling fluid flow or pressure and has particular reference to valves used in a standpipe system, said valves controlling the discharge of water to pipes or hose lines for fire protection.

The device disclosed herein is similar in some respects to that disclosed in my prior Patent No. 1,752,836, dated April 1, 1930. The principal object is the provision of an improved regulating device which is associated with a shut-off valve and which can be adjusted to limit or regulate the maximum pressure or flow which is delivered when the shut-off valve is opened, the device being connected with an outlet branch of a system in which different pressures occur at different portions of the system, such as in standpipe systems or fire protection lines in buildings.

In my prior patent the device for regulating or limiting the pressure and flow was so arranged that, once set, its adjustment could not be changed or tampered with without disconnecting the line in which it was installed.

Under certain conditions such as an unexpected drop in pressure in the system or the using of a number of hose lines at one time, it may be desirable to change or increase the delivery pressure at different outlet connections, or for other reasons it may be desirable to obtain more pressure, and the present invention relates to a simple and effective form of regulator wherein this is possible.

It is an object of the invention to provide external and readily accessible means so that the setting of the regulator can be changed quickly with ease and certainty if the necessity should arise, without moving the body or casing of the regulator and without disconnecting the hose or piping, and yet to safeguard the regulator against mischievous or malicious manipulation. A further object is to provide means for indicating outside the regulator the condition at which it is set.

The regulator comprises a tubular member adapted to be connected in a hose or other outlet from the standpipe, which outlet is ordinarily provided with an opening and closing valve to which the regulator valve is auxiliary. As in my prior patent referred to, the regulator elements include two ported discs, one of these discs being fixed in the tubular member and the other being turnable about its center so that the areas of the flow openings provided by the overlapping ports and solid portions of the discs can be varied.

In the device illustrated herein a spindle is passed through a tight opening in the tubular member, this spindle being connected by teeth or the like with the rotary disc and having an external handle, so that by turning the spindle the movable disc can be shifted to any desired degree. The locking and indicating provisions cooperate with the outer portion of the mechanism for changing the position of the rotatable disc.

Another object of the invention is to provide means to prevent tampering with the pressure limiting regulator, which means can be broken in case of emergency.

Other objects and advantages will become apparent as the specification proceeds. In the accompanying drawings, in which preferred embodiments of the invention are illustrated:

Fig. 1 is an elevation, partly in section, of a valve and casing attached thereto, the casing containing the adjustable means for regulating the flow;

Fig. 2 is a cross-sectional view taken on the line 2—2 of Fig. 1;

Fig. 3 is a fragmentary detail sectional view taken on the line 3—3 of Fig. 2;

Fig. 4 is an elevation, partly in section, showing a somewhat different form of adjustable means for regulating the flow, this means being built into the valve;

Fig. 5 is a bottom plan view of the parts illustrated in Fig. 4; and

Fig. 6 is a detail sectional view taken on the line 5—5 of Fig. 3.

Referring to Figs. 1 and 2, the reference numeral 6 designates a standard elbow globe valve casing of the type ordinarily employed for outlet control valves used in a standpipe system for fire protection. The casing 6 is formed with an interiorly threaded inlet opening 7, into which is screwed the inlet conduit 8, and with a discharge connection 9 having exterior threads 10 adapted to receive a tubular casing 11. Intermediate the inlet and discharge connections the valve has formed therein the circular valve seat 12 adapted to cooperate with the valve member 13, carried by the stem 14, the latter being threaded in the valve bonnet 15 and passing through a stuffing-box 16 and being provided with a hand-wheel 17.

Formed integral with the central portion of the casing 11, or secured therein, is a fixed disc or wall 18 having a plurality of sector ports 28 cut through it. This disc has a central aperture, which is preferably threaded. A disc 19, formed with similar ports 21 is fitted rotatably in the casing and lies against the fixed disc, the disc 19 being connected to the fixed disc by a shouldered screw 20, which holds the rotatable disc in place while permitting it to be turned.

The disc 19 has teeth 22 which are engaged by the threaded part 23, or worm, of a spindle 24. The spindle 24 is rotatably mounted in a lateral extension 25 of the casing 11 and a stuffing-box 26 is provided. The outer end of the spindle has a handle 27 by means of which the spindle may be rotated, and thus turn the disc 19 in relation to the fixed disc.

The ports 28 in the fixed disc are indicated in broken lines in Fig. 2, and it will be quite obvious from the figures that by means of the threaded spindle 24 the disc 19 may be rotated in relation to the spider 18 so as to give any flow area desired through the ports 20 and 28.

In the form of the device shown in Figs. 1, 2 and 3, means are illustrated for holding the ports in substantially any desired set relation to each other. This means comprises a casting 29 having a portion 30 encircling the spindle handle 27, and its other end secured in a substantially permanent manner, by riveted screws or otherwise, to a lug 31 extending from the casing 11. The casting 29 is made of a brittle or fragile material and has a weakened portion 32, so that a slight tap with a hammer or other object will cause it to break along the weakened line, after which the spindle can be rotated to increase or decrease the flow area.

A suitable marking 33, as shown in Fig. 3, may be provided on the stuffing-box nut 26, so that a person may readily ascertain in which direction to turn the spindle to increase or decrease the flow.

Threads 34 are provided on the outer end of the casing 11 and these threads are adapted to receive a standard hose coupling or other discharge conduit.

In the operation of the device the ports are adjusted so that the proper opening is provided for the required pressure at the station at which the valve is located and the spindle handle is locked by the means heretofore described. In an emergency such as an unexpected drop or increase in pressure, the casting 28 is broken and the spindle 25 rotated to secure the proper pressure.

Reference will now be had to Figs. 4, 5 and 6. In the form illustrated in these figures the device is located in the outlet opening of the valve casing and similar reference characters on the valve parts refer to similar parts.

The exterior threads 35 correspond to the threads 33 in Fig. 1, and are likewise adapted to receive a standard hose coupling or other form of discharge conduit.

In this instance the regulating device is located in the discharge branch of the valve.

The fixed disc 36 has ports 37 and the rotatable disc 38 similar ports 39. The position of the disc and spider in relation to each other is reversed from that shown in Fig. 1, and the fastening means 40 is slightly different, but these differences are not significant.

The disc 38 has on its lower face a segmental rack 41, which is engaged by a pinion 42. The pinion 42 is mounted on a spindle 43, passing through a boss 44 and a stuffing-box 45.

The outer end of the spindle 43 has lugs 46 for a spanner wrench or for operation by hand. An indicator 47 cooperates with an index 48 on the boss 44 so as to register the position of the disc 38. A frangible arm 29a engaging one or other of the lugs 46 serves to lock the regulator at the degree of port opening for which it may be set at the time of installation or at any later time.

In the majority of instances the outlet opening of the valve casing 6, or an extension thereof, forms the most convenient location for the device embodying the invention, and I have shown it in this position in the illustrative form, but it will be apparent that the specific location of the device with respect to the main valve may be varied and that in so far as the operation of the device is concerned it might be placed on the inlet side of the valve.

I claim:

In a water distribution system for buildings, a regulating device comprising a tubular member adapted to be connected in a branch of the system, fixed and rotatable ported discs both located within said tubular member across the water passage, an operating spindle passing through the wall of said tubular member, teeth on said spindle and on said rotary disc so that by turning said spindle the port area through the discs can be adjusted, and a frangible arm fixed to the outside of said tubular member and holding an outer portion of the spindle, so that the spindle can not be turned without breaking said arm.

WILLIAM F. CONRAN.